May 13, 1952 W. S. FLETCHER 2,596,139
STREAMLINED AUXILIARY FUEL TANK
Filed April 1, 1949 2 SHEETS—SHEET 1
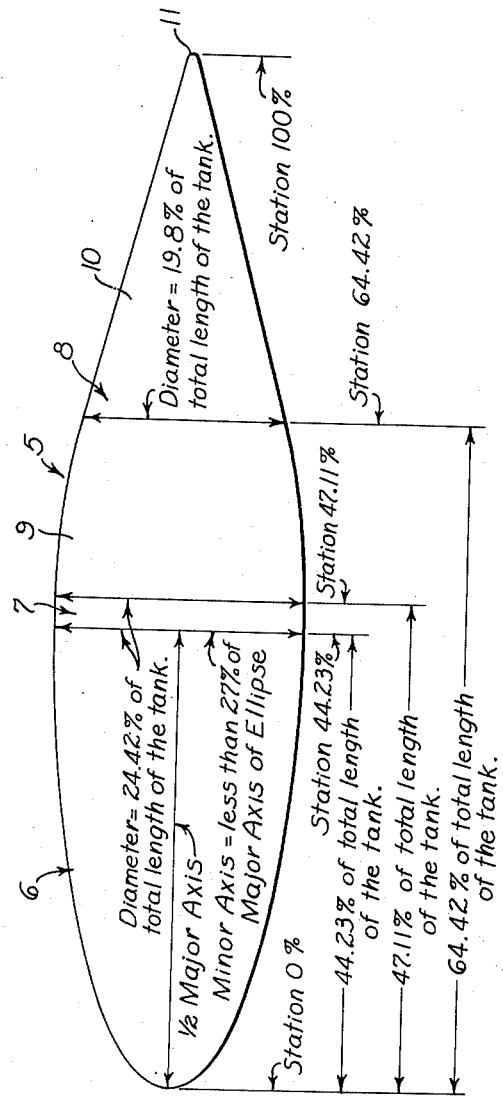
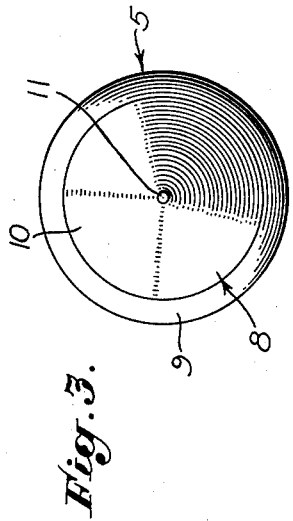
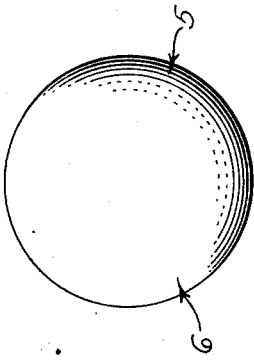
INVENTOR.
WENDELL S. FLETCHER
BY HIS ATTORNEYS.
HARRIS, KIECH, FOSTER & HARRIS May 13, 1952 W. S. FLETCHER 2,596,139
STREAMLINED AUXILIARY FUEL TANK
Filed April 1, 1949 2 SHEETS—SHEET 2

INVENTOR.
WENDELL S. FLETCHER
BY HIS ATTORNEYS.
HARRIS, KIECH, FOSTER & HARRIS

Patented May 13, 1952

2,596,139

UNITED STATES PATENT OFFICE 2,596,139

STREAMLINED AUXILIARY FUEL TANK

Wendell S. Fletcher, South Pasadena, Calif., assignor to Fletcher Aviation Corporation, Pasadena, Calif., a corporation of California Application April 1, 1949, Serial No. 84,816

4 Claims. (Cl. 244—130)

This invention relates to aircraft and particularly to auxiliary fuel tanks adapted for mounting on the wing tips of an airplane.

Auxiliary fuel tanks are employed extensively in aircraft and it is common, particularly in high-speed military airplanes, to mount the tanks on the tips of the wings. As is well known to designers of high-speed airplanes which are to approach or even exceed sonic speed, it is important that the airplanes be as free from parasitic drag as possible, that is, devoid of projections or surfaces which create drag tending to impair the speed and maneuverability of the airplane. Other important factors which must be considered by the aerodynamicists are those of air turbulence and compressibility which occur as the airplane is subjected to air velocities approximating that of the speed of sound. To avoid such conditions, the airplane, including all of its components, such as wing tip auxiliary fuel tanks, must be designed to withstand such forces.

The present invention is concerned with auxiliary wing tip fuel tanks for use in connection with such high-speed airplanes and has for one of its principal objects to provide an auxiliary fuel tank which is so designed that it offers minimum resistance to the speed of the airplane and does not impair its maneuverability. That is to say, it is an important object of this invention to provide an auxiliary fuel tank which is designed to have an optimum Mach coefficient which compares very favorably with that of the high-speed airplane on which the tank is mounted so that the tank has the ability to resist compressibility and other forces or conditions present when the airplane is flown at speeds approximating that of sound and will not reduce the speed of the airplane or impair its maneuverability. A related object is to provide a tank of the character referred to which has a conoidal nose section which is semi-elliptical in longitudinal section, a tail section which is conical, and a cylindrical intermediate section, the nose and tail sections each being designed in accordance with certain Mach number coefficient which provide the optimum over-all Mach number coefficient necessary to withstand compressibility and other conditions at sonic speed.

Another object of the invention is to provide an auxiliary fuel tank of the type indicated in which there exist carefully and accurately calculated relations between the axial lengths of the nose and tail sections and their respective diameters, between the relative axial lengths of these sections, between the axial lengths of each section and the over-all length of the tank, and between the diameter of the tank at any particular point and the over-all length of the tank, these relative values determining the over-all Mach number coefficient of the tank.

Another object is to provide a series of tanks, of the character referred to, which are adapted to contain predetermined volumes of fuel, these tanks being designed to effect an optimum over-all Mach characteristic and all having the same relative proportions so that they possess the same general configuration or profile shape and characteristics so necessary to the successful performance of the high-speed airplane. A related object is to provide a tank of this type of streamlined shape having a profile in which the ordinates of the curves forming the shape are calculated and plotted in percentages of the total length of the tank, regardless of this total length, so that the optimum Mach number is maintained.

Further objects will be apparent from the following specification which describes a preferred embodiment of the invention, by way of example, as illustrated by the accompanying drawing. In the drawing:

Fig. 1 is a side view of an auxiliary fuel tank adapted for mounting on the wing of a high-speed airplane;

Fig. 2 is an end view of the nose of the tank; and

Fig. 3 is an end view of the tail or aft section of the tank.

Figure 4:
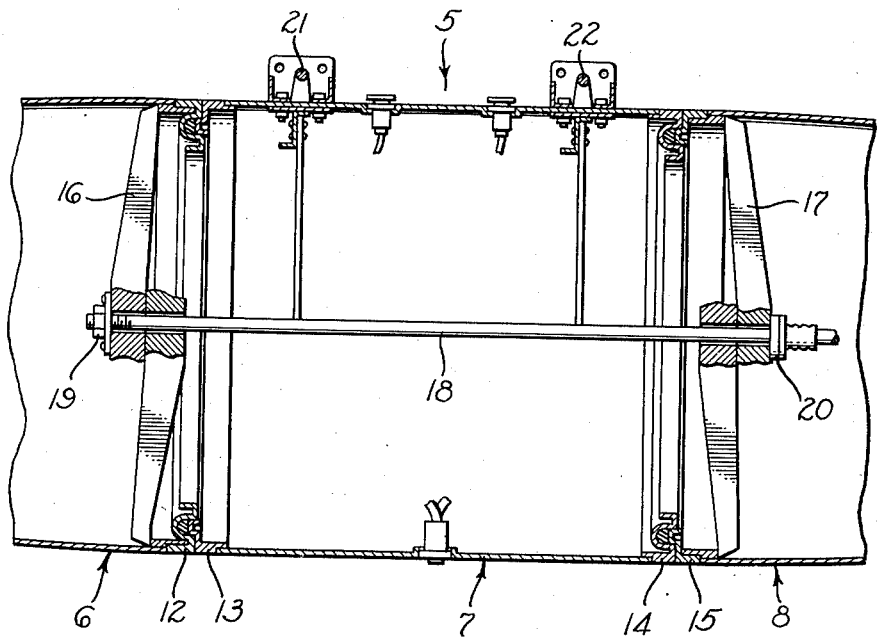
Fig. 4 is an enlarged, fragmentary longitudinal sectional view showing a manner in which the nose, center, and tail sections of my invention may be connected together.

Referring to the drawing in detail, the fuel tank 5 illustrated therein is one of the auxiliary type usually constructed from sheet metal and adapted to be mounted on the tip of a wing of a high-speed airplane. As shown in Fig. 1, the tank 5 is made in three sections, namely, a forebody or nose section 6, a midbody or intermediate section 7, and an afterbody or tail section 8. The sections 6, 7 and 8 may be formed integrally or made as separate components which may be secured in end-to-end relation in the manner and by the means disclosed in my pending application for patent, Serial No. 63,822, filed December 6, 1948.

The manner in which the sections 6, 7, and 8 may be made as separate components and secured in end-to-end relation is shown and described in detail in my said application Serial No. 63,822, to which reference is hereby made for the details thereof, but such construction is generally illustrated in Fig. 4 of the drawings hereof. As shown in Fig. 4, the nose section 6 and center section 7 may be provided with co-operative sealing rings 12 and 13, respectively, and the center section 7 and tail section 8 may be provided with co-operating sealing rings 14 and 15, respectively. The nose section 6 is provided with a web means 16 and the tail section 8 is provided with a web means 17, and a clamping spindle or tie rod 18 extends therethrough, one end of the tie rod being threaded to mate with a nut 19 secured to the web 16, and the tie rod being provided with a collar 20 adapted to engage the web 17 when the tie rod is rotated by any suitable means, to draw the webs towards each other to in turn cause the sections 6, 7, and 8 to be firmly clamped together. The center section 7, as shown in Fig. 4, may be provided with hangars 21 and 22 which may be employed as the means for attaching the fuel tank to the wing of an airplane. As will be understood, by unscrewing the tie rod 18 from the nut 19 the three sections 6, 7, and 8 may be taken apart, and another center section of different length may be substituted for the center section 8.

In the preferred form of the present auxiliary fuel tank 5, the nose portion 6 takes the shape of a conoid of semi-elliptical longitudinal section, the major axis of the ellipse aligning with and forming part of the longitudinal axis of the tank and the minor axis extending normal to the axis of the tank, it being noted that the entire tank is of circular cross section throughout its length (see Figs. 2 and 3). The intermediate section 7 is a cylinder having an outside diameter equal to that of the base of the nose section 6 so as to match therewith in providing a smooth, unbroken, outer surface. The afterbody or tail section 8 has a forward frusto-conoidal portion 9 and an integral rearward conical portion 10. The forward or base end of the frusto-conoidal portion 9 matches the rearward end of the intermediate cylindrical section 7 to provide a smooth connection therewith. The rearward or apex end of the conical portion 10 is preferably provided with a small rounded tip 11.

An auxiliary fuel tank which is to be mounted on a wing tip of a high-speed airplane must be smooth and streamlined in order to reduce drag to a minimum and a fuel tank having the contour shown in the drawing and described above has these characteristics. It is also important that the auxiliary fuel tank be so designed that it has the ability to resist compressibility and other forces which may be present when the tank passes through the air at speeds approximating that of sound. To obtain a tank having this characteristic it is designed to have an optimum Mach number coefficient, the Mach number being the ratio between the maximum speed of an object through air to the speed of sound. It has been found that a tank constructed with an elliptical nose section, a cylindrical intermediate section, and a combined frusto-conoidal, conical tail section such as illustrated in the present drawing fulfills the requirement, particularly when the relative diameters and lengths of the various sections are made in accordance with the data to be hereinafter presented. It is insufficient that the various sections of the tank follow the general contours described above since variations in diameter of the tank, lengths of the sections, and in the lengths of the major and minor axes of the elliptical nose section will effect the aerodynamic characteristics of the tank, that is, vary its Mach coefficient. The criterion, therefore, is to establish, either mathematically or through wind tunnel tests, the proportions necessary to produce a tank which is not only streamlined but possesses the optimum over-all Mach coefficient.

As is well known to aerodynamicists, the velocity of air flowing longitudinally from the nose to the tail of a streamlined object, such as that illustrated in the drawing, increases and for this reason it is usually necessary that the Mach coefficient of the tail section be of somewhat higher value than that of the nose section. However, to obtain a tank which is most efficient at critical sonic or supersonic speeds, it is necessary to establish a relation between the Mach numbers of the components such that the optimum over-all Mach ratio is obtained. The establishment of this desirable over-all coefficient is complicated by the fact that the tank must have a predetermined volume so that it will contain the necessary amount of fuel.

I have determined through extensive research that a definite relation can be calculated between the dimensions of the portions of components of a streamlined tank which will meet all the requirements, regardless of the capacity of the tank. Obviously, the over-all length of a wing tip auxiliary fuel tank is of utmost importance and a determining factor in controlling the attitude of the airplane to which it is attached and for this reason I have calculated the various practical lengths of tanks for containing predetermined amounts of fuel. To obtain the length of tank necessary to contain the proper amount of fuel, the length of the intermediate cylindrical section 7 is varied as indicated in the following table which, it is to be understood, is merely typical and in accordance with mathematical calculation of gallonage capacity for cylindrical shapes:

TABLE A (For cylinder 25.41" diameter)

| Tank Capacity with 3% Air Space Allowance (Gallons) | Length of Cylindrical portion 7 (inches) |
| --- | --- |
| 122 | [1] 3 |
| 150 | 16 |
| 165 | 23 |
| 185 | 33 |
| 200 | 40 |
| 250 | 63 |
| 300 | 86 |

[1] Minimum.

In addition to increasing or decreasing the length of the cylindrical intermediate section, the diameters and lengths of the other components 6 and 8 may be proportionately varied. However, regardless of the capacity of the tank, there exist definite and fixed relations between the dimensions of the components. I have found that by using the total length of the tank as a basis, the proportions of the components can be readily calculated as percentages of this length to obtain a tank having the desired contour and possessing the optimum Mach coefficient. For example, I have determined that the length of the major semi-axis of the semi-elliptical nose section 6 should be equal to substantially 44.23% of the total length of the tank and that the length of the minor axis of the ellipse should be equal to substantially 24.42% of the total length of the tank in order to produce a conoidal nose section which is streamlined and possesses the necessary Mach coefficient. The rearward or aft end of the intermediate section 7 must lie in a transverse plane whose distance from the tip of the nose section is equal to substantially 47.11% of the total length of the tank, the diameter of the intermediate section being equal to that of the minor axis of the ellipse or substantially 24.42% of the total length of the tank. The intersection of the curve of the frusto-conoidal portion 9 and the base line of the conical portion 10 is disposed at a distance from the tip of the nose section 6 equal to substantially 64.42% of the total length of the tank and the diameter of the tank at this point is equal to substantially 19.8% of the total length of the tank. It is thus seen that the length of the nose section 6 is equal to substantially 44.23%, the length of the tail section 8 is equal to 52.89% and the length of the intermediate section 7 is equal to 2.88% of the total length of the tank. The diameters of the tank at different points or "stations" spaced along the longitudinal axis of the tank and intermediate the locations already discussed are listed in the following table which may be consulted to determine the ordinates of the tank contour at various selected stations, the location of the stations being given as distances from the tip of the nose section 6 and expressed in terms of percentages of the total length of the tank.

TABLE B

*Ordinates*

| Station, Per cent [1] | Diameter, Per cent [1] | |
|---|---|---|
| 0 | 0 | |
| 1.92 | 7.12 | |
| 3.80 | 9.96 | |
| 5.75 | 12.04 | |
| 7.70 | 13.74 | |
| 9.61 | 15.20 | |
| 13.46 | 17.54 | |
| 17.30 | 19.36 | Nose Section 6. |
| 21.15 | 20.82 | |
| 25.00 | 21.98 | |
| 28.84 | 22.88 | |
| 32.69 | 23.56 | |
| 36.53 | 24.04 | |
| 40.38 | 24.32 | |
| 44.23 | 24.42 | |
| 47.11 | 24.42 | Intermediate Section 7. |
| 50.00 | 24.28 | |
| 52.88 | 23.92 | |
| 55.76 | 23.28 | |
| 58.65 | 22.42 | Tail Section 8. |
| 61.53 | 21.24 | |
| 64.42 | 19.80 | |
| 100.00 | 0 | |

[1] Indicates per cent of total length of tank.

It is apparent from the foregoing that the contour of tanks of various capacities can be readily determined and plotted from the data listed in tables A and B, since the dimensions of the components are given as percentages of the total length of a tank. An auxiliary wing tip fuel tank having a contour developed in accordance with this data is, as before explained, streamlined and has an over-all optimum Mach coefficient.

Assuming that it is desirable to produce a fuel tank having a capacity of, say, 122 gallons, it is first found by mathematically constructing table A with a minimum intermediate section through the use of table B. By referring to table B it will be seen that the length of the tank or a minor axis in inches is the starting point in mathematically constructing table A. Having thus determined the over-all length of the proposed tank to be 104", the length of the semi-elliptical nose section 6, which is 44.23% of the total length of the tank, is found to be 46" and it is also determined that the diameter of its base end (the minor axis of the ellipse) is 24.42% of the total length of the tank, that is, 25.41". The diameter of the cylindrical intermediate section is, of course, equal to the minor axis of the ellipse. It is also found that the line of intersection between the curved and straight portions 9 and 10 of tail section 8 is located at a distance from the tip of the nose section 6 equal to 64.42% of the total length of the tank and this is equal to 67", the diameter of the tank at this line being 19.8% of the length of the tank or 20.6". In a like manner, the diameters of the tank at other points or stations can be readily calculated and the ordinates plotted to derive the contour of the proposed tank, it being apparent that since tanks of different capacities will be alike in contour and vary only in size, their Mach coefficients will remain equal. Consequently, by my discovery it is possible to accurately construct tanks of various capacities for use on airplanes of different types which will have a constant and optimum Mach coefficient. It is thus apparent that this invention provides an auxiliary fuel tank suitable for mounting on the wing tips of high-speed airplanes and possessing the optimum over-all Mach coefficient. As previously explained, it is necessary that the nose and tail sections have different Mach numbers, due to the increased velocity of the air passing lengthwise of the tank. This relation of Mach numbers prevails in the present tank but together these numbers provide an average Mach number coefficient which is the optimum.

It is within the concept of this invention to add to the auxiliary fuel tanks such aerodynamic elements as tail fins, trim tabs, etc., to achieve aerodynamic balance in airplanes using the present improved tanks.

The essence of this invention is the use of a basic ellipse whose minor axis is less than 27 per cent of its major axis, together with a conical tail section.

The use of the aerodynamically neutral, cylindrical center section having a length of over 2.88 per cent is neglected when computing the nose and tail sections, this 2.88 per cent length being considered the minimum cylindrical section which can be used practically to provide the joining area. Elimination of this 2.88 per cent cylindrical center section would result in a new set of per cent figures for the same contours. Since the percentages given herein are merely typical and are subject to variations, the invention is not to be limited in this respect.

I claim as my invention:

1. An auxiliary tank adapted for mounting adjacent a wing surface of a high-speed airplane, comprising: a conoidal nose section of semi-elliptical longitudinal sectional contour with the major axis thereof extending longitudinally of said tank; a cylindrical intermediate section; and a tail section having a right circular conical end portion, all said sections being circular in transverse section and of the same maximum diameter and being releasably joined together at a circumferential joint defining a continuous and smooth longitudinal transition between the surfaces of said sections whereby other cylindrical intermediate sections may be added or substituted to change the capacity of said tank or to shift the center of gravity thereof.

2. An auxiliary tank as defined in claim 1 wherein said tail section includes a longitudinally circularly arcuate curved surface portion of substantial length of nearly cylindrical shape adjacent said intermediate cylindrical section and tangent to said conical end portion whereby to merge smoothly and tangentially therewith.

3. An auxiliary tank as defined in claim 1 wherein said nose and tail sections are so proportioned that the ratio of their longitudinal dimensions to their maximum diameter is of the order of magnitude of two.

4. An auxiliary tank as defined in claim 1 wherein said conoidal nose section has a maximum diameter approximately 55% of its length, said cylindrical intermediate section has a length not less than 2.88% of the total length of the tank, and wherein said tail section has a maximum diameter of approximately 46% of its length.

WENDELL S. FLETCHER.

REFERENCES CITED

The following references are of record in the file of this patent:

UNITED STATES PATENTS

| Number | Name | Date |
| --- | --- | --- |
| 999,469 | Schutte | Aug. 1, 1911 |
| 2,421,699 | Johnson | June 3, 1947 |
| 2,471,296 | Allen et al. | May 24, 1949 |
| 2,505,604 | Clark et al. | Apr. 25, 1950 |
| 2,514,888 | McFarland | July 11, 1950 |

OTHER REFERENCES

"Airplane Design," (first edition), by Warner, McGraw-Hill Book Co., Inc., New York, N. Y. pp. 200–206, also Fig. 122 on p. 201.

British, "Flight" magazine of November 4, 1937, vol. 32, pp. 450–451.